US010529155B1

(12) United States Patent
Derakhshani

(10) Patent No.: US 10,529,155 B1
(45) Date of Patent: Jan. 7, 2020

(54) EMPLOYING PRESSURE SIGNATURES FOR PERSONAL IDENTIFICATION

(71) Applicant: Alibaba Group Holding Limited, George Town (KY)

(72) Inventor: Reza R. Derakhshani, Shawnee, KS (US)

(73) Assignee: Alibaba Group Holding Limited, George Twon, Grand Cayman (KY)

( * ) Notice: Subject to any disclaimer, the term of this patent is extended or adjusted under 35 U.S.C. 154(b) by 0 days.

(21) Appl. No.: 16/160,881

(22) Filed: Oct. 15, 2018

(51) Int. Cl.
*G07C 9/00* (2006.01)

(52) U.S. Cl.
CPC ................ *G07C 9/00158* (2013.01)

(58) Field of Classification Search
CPC ............ G07C 9/00158; G07C 9/00087; G07C 9/00563; G07C 9/00071; G07C 9/00103; G07C 9/00571; G07C 9/00111; G07C 9/00134; G07C 2009/00095; G07C 9/00142

USPC ......................................................... 340/5.52
See application file for complete search history.

(56) References Cited

U.S. PATENT DOCUMENTS

2017/0142501 A1* 5/2017 Jakobsson ................ H04Q 9/00
2018/0357644 A1* 12/2018 Tabe ................. G06Q 20/40145

* cited by examiner

*Primary Examiner* — Mark S Blouin
(74) *Attorney, Agent, or Firm* — Fish & Richardson P.C.

(57) ABSTRACT

Methods, systems, and apparatus, including computer programs encoded on a computer storage medium, for a biometric authentication system. In one aspect, a method includes capturing pressure measurement data as a sequence of pressure maps as the user applies pressure to the pressure sensing device; determining a dynamic pressure signature for the user based on the pressure measurement data, the dynamic pressure signature including a temporal sequence of the pressure maps; and authenticating the user based on a comparison of the dynamic pressure signature to an initial dynamic pressure signature.

20 Claims, 5 Drawing Sheets

EMPLOYING PRESSURE SIGNATURES FOR PERSONAL IDENTIFICATION

TECHNICAL FIELD

This specification generally relates to pressure sensor devices in biometric identification technology.

BACKGROUND

Systems incorporating biometric identification technology uniquely identify users by evaluating one or more distinguishing biological traits. Unique identifiers include fingerprints, hand geometry, earlobe geometry, retina and iris patterns, voice waves, DNA, and signatures.

SUMMARY

Implementations of the present disclosure are generally directed to employ pressure sensing in a biometric system. More specifically, implementations are directed to capturing pressure measurement data as a sequence of pressure maps as a user applies pressure to a pressure sensor device by, for examples, walking or standing on the surface of pressure sensor device. A static and a dynamic pressure signature may be generated for each user from the captured pressure measurement data in form of a temporal sequence of pressure maps. The dynamic pressure signature being employed to authenticate the users to enable the use of services.

In a general implementation, systems, apparatus, and methods for authenticating a user based on pressure measurement data include capturing pressure measurement data as a sequence of pressure maps as the user applies pressure to a pressure sensing device. A dynamic pressure signature is determined for the user based on the pressure measurement data. The dynamic pressure signature including a temporal sequence of the pressure maps. The user is authenticated based on a comparison of the dynamic pressure signature to an initial dynamic pressure signature.

In another general implementation, one or more non-transitory computer-readable storage media coupled to one or more processors and having instructions stored thereon which, when executed by the one or more processors, cause the one or more processors to perform operations that include: capturing pressure measurement data as a sequence of pressure maps as a user applies pressure to a pressure sensing device. A dynamic pressure signature is determined for the user based on the pressure measurement data. The dynamic pressure signature including a temporal sequence of the pressure maps. The user is authenticated based on a comparison of the dynamic pressure signature to an initial dynamic pressure signature.

In yet another general implementation, a system includes a pressure sensor device, one or more processors; and a computer-readable storage device coupled to the one or more processors and having instructions stored thereon which, when executed by the one or more processors, cause the one or more processors to perform operations that include capturing pressure measurement data as a sequence of pressure maps as a user applies pressure to the pressure sensing device. A dynamic pressure signature is determined for the user based on the pressure measurement data. The dynamic pressure signature including a temporal sequence of the pressure maps. The user is authenticated based on a comparison of the dynamic pressure signature to an initial dynamic pressure signature.

An aspect combinable with the general implementations, the operations or method includes generating a similarity score based on the comparison of the dynamic pressure signature to the initial dynamic pressure signature, and authenticating the user based on the similarity score.

In an aspect combinable with any of the previous aspects, the similarity score is based on Euclidean distance of the dynamic pressure signature and the initial dynamic pressure signature.

In an aspect combinable with any of the previous aspects, the similarity score in included in multimodal-biometric score; and wherein the user is authenticated based on the multimodal-biometric score.

In an aspect combinable with any of the previous aspects, the pressure maps includes a collection of time signals derived from each pressure pixel observed by the pressure sensing device as the user applies pressure.

In an aspect combinable with any of the previous aspects, the dynamic pressure signature includes at least one of which of the user's feet predominantly touches the ground as the user walks, a first point of impact on each of the users feet as the user walks, a progression of pressure points as the user walks, and gait patterns for the user.

In an aspect combinable with any of the previous aspects, the captured pressure measurement data includes the user's foot/show contour, an angle between the user's feet, curvature of the user's feet, gait, balance, sway, posture, weight distribution, the user's dominant foot, or ballistocardiograms.

In an aspect combinable with any of the previous aspects, the initial dynamic pressure signature was captured as the user entered into an area.

In an aspect combinable with any of the previous aspects, the initial dynamic pressure signature was captured during an enrollment process.

In an aspect combinable with any of the previous aspects, the operations or method includes capturing, with a camera, an image of the user, wherein a distance of the user from the camera is determined based on a position of the pressure sensing device, wherein authenticating the user is further based on a comparison of the image of the user to an initial image of the user captured during the enrollment process.

In an aspect combinable with any of the previous aspects, the operations or method includes determining a static pressure signature for the user based on the pressure measurement data; wherein authenticating the user is further based on a comparison of the static pressure signature for the user to an initial static pressure signature captured during the enrollment process.

In an aspect combinable with any of the previous aspects, the static pressure signature includes an approximate size and shape of the user's foot or shoes, the user applies pressure to the pressure sensing device by standing on the pressure sensing device or by walking across the pressure sensing device.

In an aspect combinable with any of the previous aspects, the pressure sensing device is embedded in flooring.

In an aspect combinable with any of the previous aspects, the operations or method includes displaying, on a display, information to the user based on authenticating the user.

In an aspect combinable with any of the previous aspects, the pressure sensing device comprises a communication interface; and wherein the pressure measurement data is received through the communication interface.

In an aspect combinable with any of the previous aspects, the pressure sensing device comprises an array of pressure sensing elements.

In an aspect combinable with any of the previous aspects, each of the pressure sensing elements comprises at least one force sensitive resistor (FSR).

Particular implementations of the subject matter described in this disclosure can be implemented so as to realize one or more of the following advantages. The dynamic pressure signature is a soft biometric modality that is independent of many other biometric modalities and thus it can contribute to the corpora of identification signals in a biometric system. Further, unlike camera-based systems, a dynamic pressure signature is not affected by adverse optical circumstances. The dynamic pressure signature can also protect users of a biometric authentication system from some spoofing attacks. Shoe-prints may also be gleaned from such pressure maps and used for user identification. Since the location of user's feet are known, standoff distance estimates between user and for instance a kiosk employing such scanner may also be determined.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
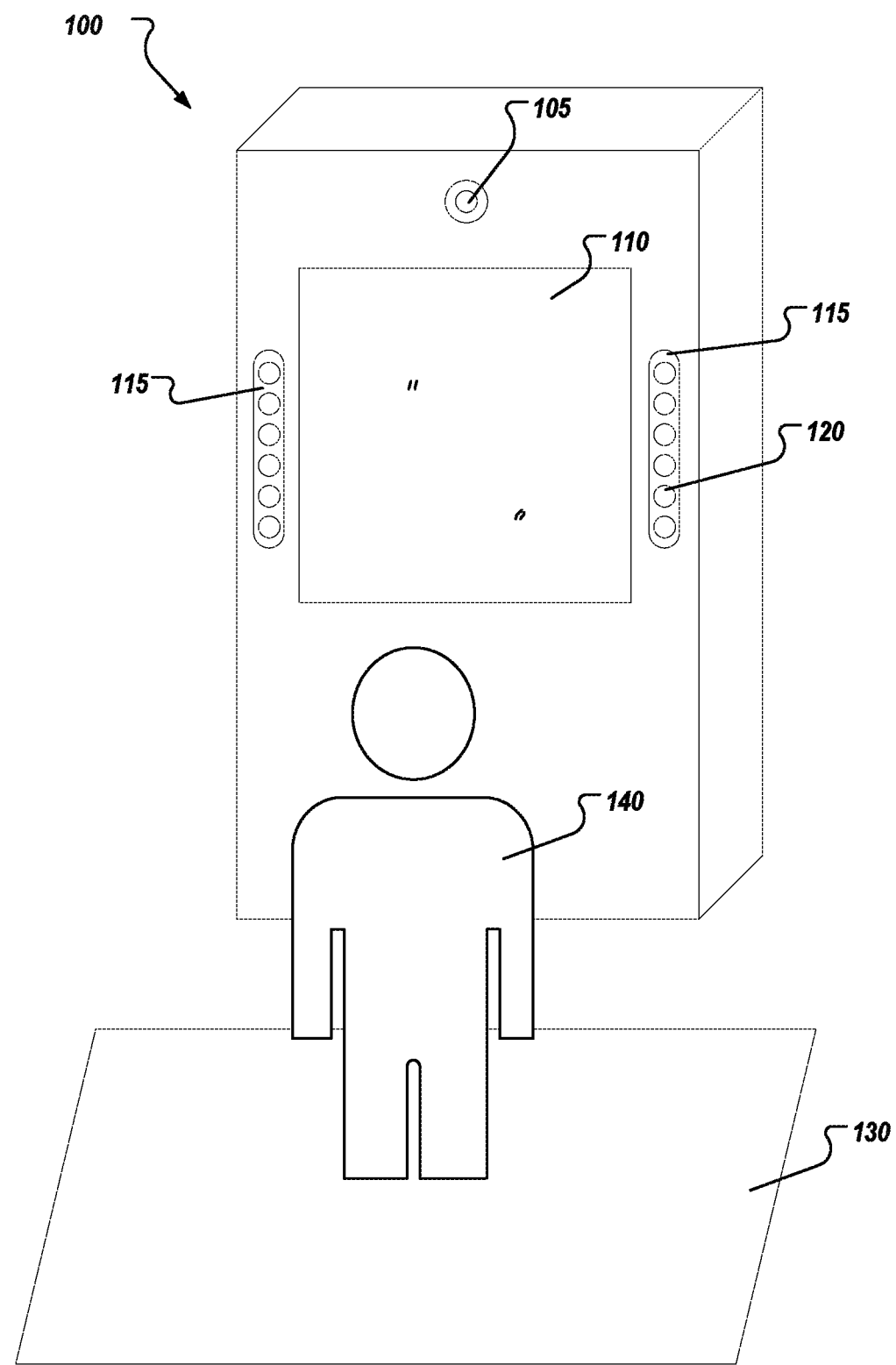
FIG. 1 depicts a kiosk machine as an example environment to which a biometric authentication system may deployed.

Implementations of the present disclosure are generally directed to capturing static and dynamic pressure signatures for biometric authentication. More particularly, implementations of the present disclosure are directed to a biometric authentication system deployed within a kiosk type device that employs a pressure sensor surface to capture static and dynamic pressure signatures of users. The static and dynamic pressure signatures, as well as the static "shoe-prints", may be employed by the biometric authentication system to authenticate the users. Services are provided, through the kiosk, to the users based on the authentication.

Various biometric identification/authentication systems are based on capturing biometric data that can be compared with or analyzed with reference to baseline or template date to generate a multimodal-biometric score. Biometric data refers to any computer data that is created during a biometric process. Authentication systems may employ models, templates, images, maps, similarity scores and so forth that are generated based on biometric data/traits collected from/ about users, such as prints (e.g., fingerprints, foot prints, palm prints), retinal scans, pressure signatures (e.g., static, dynamic), face scans, gait measures, olfactory biometrics (e.g., odor), and auditory biometrics (e.g., voice prints). All or a subset of the above biometric traits maybe fused to provide a more accurate multimodal-biometric score from the aforesaid signals to be used by itself or to help the primary biometric modality in matching as well as anti-spoofing, since the spoofers usually attack one or few, and not all, biometric modalities in a multimodal system.

In view of the foregoing, and as described in further detail herein, implementations of the present disclosure provide for a biometric authentication system that can be deployed within a kiosk-type device, such as an automated teller machine (ATM). In some implementations, the described biometric authentication system employs designated surface with embedded pressure sensors, such as pressure sensing mat, to capture pressure measurement data as a user walks over or stands on the sensors. The captured pressure measurement data may include a user's foot/show contour, angle between the feet, curvature of the feet, gait, balance, sway, posture, weight distribution, dominant foot, ballistocardio-grams, and so forth.

This pressure measurement data can be analyzed to generate a baseline or template pressure signature (e.g., static and/or dynamic) for each user. These baseline signatures may be generated based on a sequence of pressure maps, which include a collection of time signals derived from each pressure pixel observed by the pressure sensitive surface on which a user is standing. The pressure signatures may also be biometrically used, for example, for a stationary user as he or she interacts with a kiosk or similar device. In some implementations, a static pressure signature includes the approximate size and shape of a user's foot, partial attributes, in case of specialty footwear, such as the width of the sole and an overall approximate length of the shoe/foot (e.g., if the user is wearing high heels), and so forth. In some implementations, the dynamic pressure signature includes how the user walks or moves, such as the area of the foot the predominantly touches the ground, the first point of impact on the foot, how pressure points progress, gait patterns, center of pressure or gravity movement signals, and so forth. Gait patterns may include, for example, repetitious sequence of limb motions to move the body forward while simultaneously maintaining stability. These pressure signatures can be employed alone or in combination with other biometric data, such as described above, in biometric authentication.

In some implementations, a baseline or template static and/or dynamic pressure signature can be captured during an enrollment process. For example, a biometric authentication system may require enrolling users to stand or walk on a designated surface, such as a pressure mat or flooring, with embedded pressure sensors during an enrollment process to capture a baseline dynamic pressure signature for each user. In some implementations, the static and dynamic pressure signatures captured during the enrollment process may be stored on a storage device accessible to the biometric authentication system. During run-time, sample (verification) static and/or dynamic pressure signatures of a user can be captured and compared with the stored static and/or dynamic pressure signature template(s) to determine if the user may be authenticated. In some implementations, a similarity score may be generated base on the comparison of the enrollment and verification pressure signature templates. In some implementations, this similarity score is based on Euclidean distance of the templates. In some implementations, this distance metric could be cosine or Mahalanobis.

In some implementation, such similarity measure is learned by way of exposing a machine learning paradigm, such as a neural network (static such as a convolutional neural net, convolutional neural network (CNN), or dynamic such as a long short-term memory (LSTM)); or support vector machines, Support Vector Machine (SVM), by exposing them to a large number of data points from positive (genuine user templates) or negative (impostor user templates). In some implementations, the input to these similarity measures are the raw pressure surface data streams (such as in the case of CNN and LSTM neural networks) capable of internal feature representation learning. In some implementations, such pressure signature features are derived algorithmically before presenting them to the similarity measure or classifiers. Examples of such features include center of pressure (COP) time coordinates signals and their derivatives such as path eccentricity, path length and standard deviation, swing of COP values in anteroposterior (AP) and mediolateral (ML) directions, statistics of COP time signals in AP and ML directions such as maximum, mean, standard deviation, velocity, and spectral features; as well as the area of traversed paths created by COP sways. In some implementations, families of features (such as dynamic vs. static) are classified separately and the classification scores are combined by way of a fusion scheme such as (weighted) sum rule, product rule, or hierarchical fusion. In some implementations the fusion rule itself is a trainable function parametrized by way of supervised learning to maximize the biometric accuracy of the ensemble. Other types of base-line comparisons may performed at run-time based on data captured by the pressure sensors. For examples, an optical image of user's shoes may be captured. At a low level, such images may provide data regarding the shoe's height, length, and silhouette. At higher resolutions, the data may include abnormalities in/on the shoes, such as, scuffs and apparitions in the shoe print. Such data may be employed in, for example, a short term biometric identification or forensic shoe print analysis.

FIG. 1 depicts a kiosk machine 100 as an example environment to which a biometric authentication system may deployed. The kiosk 100 includes one or more components that support a biometric authentication system. For example, the kiosk 100 can include a camera 105, a display 110, illumination sources 115, and a pressure sensor 130. The display 110 may display information to the user 140. The display may also be used by the user 140 to interact with the kiosk 140. For example, the display may be a touch screen type of device displaying a user interface (UI) through which the user 140 can enter and receive data.

The camera 105 can be employed to capture images of, for example, the user 140 who is interacting with the kiosk 100. The illumination sources 115 may be employed to generate electromagnetic radiation at multiple wavelengths as the camera captures image data. For example, the illumination sources 115 can each include one or more light emitting diode (LED) elements 120 that may be controlled to generate electromagnetic radiation patterns or sequences at different wavelength ranges. The illumination sources 115 may be spatially separated from one another.

The pressure sensor 130 provides a surface that can be employed by the biometric authentication system to generate a static and/or dynamic pressure signature for the user 140. In some implementations, the pressure sensor 130 includes a matrix of individual pressure sensors, interweaved vertical and/or horizontal array of pressure sensing elements, and/or an imager below a surface whose optical properties change in response to pressure. In some implementations, the pressure sensor 130 is a pressure-sensing mat. Such a pressure-sensing mat can include a top layer and a base layer with a plurality of pressure sensing elements and between the layers. The base layer may be comprised of materials, such as, plastic, hardwood, and polycarbonate. The top layer may be comprised of materials such as rubber, and fabric reinforced rubber. The pressure sensing elements may be arranged as a grid (e.g., a two-dimensional array). In some implementations, the pressure sensor 130 is embedded in a surface, such as the flooring material.

The included pressure sensing elements detect the pressure applied to fixed points on, for example, the top layer of the pressure mat. Any suitable pressure sensing device can be used for the pressure sensing elements, such as electro-mechanical pressure sensors and piezoelectric sensors. The pressure sensing elements may include FSRs, which act as voltage dividers that detect, for example, physical pressure, squeezing, and weight.

The kiosk machine 100 may be used for various purposes that require authenticating users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. For example, the kiosk 100 may also be deployed as a turnstile type device. In such contexts, for example, a dynamic pressure signature for a user may be registered on entry (e.g., into a store or railway) by the user walking across the pressure sensor 130. For examples, the pressure sensors may be embedded in the floor. In such examples, the system may also be deployed to work in conjunction with check-out scanners. The user can be identified/authenticated at checkout (e.g., as they are scanning the items). The user's account may be automatically debited for the items, for example, based on the authentications. Other example contexts include the kiosk 100 working in conjunction with an active floor. In general, the kiosk 100 may be deployed at various types of locations to authenticate users interactively, or even without any active participation of the user.

In some implementations, the pressure sensor 130 may be as large as required to allow the user to freely move around a respective space. For example, the pressure sensor 130 may cover the floor of a large field or room (e.g., built into the flooring). In some implementations, the pressure sensor 130 may be a component of a large enclosed structure. Such an enclosed structure may be, for example, in a fixed position but rotationally movable such that it moves under the user 140 as the user moves (e.g., on a treadmill type device). In such implementations, the pressure sensor 130 allows the user 140 to move in one or more of at least a forward moving position, a backward moving position, a left side moving position, a right side moving position, and/or positions therebetween.

Alternatively, if space is limited, the pressure sensor 130 may be smaller. In such implementations, the user 140 may be required to move in a bounded area as he/she interacts with the kiosk 100. For example, the user 140 may be require to make serval passes on the pressure sensor 130 as the biometric authentication system generates a static and/or a dynamic pressure signature that may be used as a base-line or for authentication purposes.

In some implementations, the pressure sensor 130 may include a communication interface (not shown). The communication interface can be employed to provide digital signals to the biometric authentication system deployed to the kiosk 100. In some implementations, the communication interface may include communication via a Universal Serial Bus (USB), Bluetooth, Ethernet, wireless Ethernet, and so forth.

In some implementations, the pressure sensor 130, the captured pressure measurement data may be employed in conjunction with the camera 105 by the respective biometric authentication system deploy to the kiosk 100. For example, the location of the user 140 can be determined based on a known position/coordinates of the pressure sensors 130 (e.g., the location of the user's feet on a 2D pressure maps). The biometric authentication system may use this information to estimate a standoff distance and orientation for the user 140, which can be employed to assists in functions, such as the autofocus of the camera 105. The position data can also be used in image analysis. For example, the biometric authentication system may calculate the user's 140 height based on the position/coordinates data and a location of the face landmarks, such the eye pair or face, as perceived by cameras 105. In some implementations, device to face distance gleaned from the pressure sensing mat can be checked against inter-ocular or other visual estimates of distance to detect foul play such as spoof attacks, where for instance the attacker may be holding a spoofing screen close to the camera and thus triggering a mismatch between footprint and visually metered (e.g. inter-ocular) distance. Furthermore, during a spoof attack, a spoofer may attempt to replicate the primary (e.g. camera based) biometric modality and thus these soft biometric modalities (in this case, those gleaned from static footprint analysis) may show a mismatch and thus reject the spoof. Optionally, the dynamics of the footprint pressure maps can be used as a contributing soft biometric (e.g. revealing footedness, left and right foot pressure point sways during interaction with, for example, a UI present on the display 110) as a behavioral signature for behavioral biometric authentication.

In some implementations, the images captured using the camera 105 along with the determined static and/or dynamic pressure signatures can be processed by the biometric authentication system to identify/authenticate the user. In some implementations, the biometric authentication system may extract from the images and pressure signatures, various features, such as features derived from the face, iris, vasculature underlying the sclera of the eye, the periocular region, the gait patterns (such as described above), and so forth, to identify/authenticate a particular user based on matching the extracted features to that of one or more template images and the pressure signatures (static and/or dynamic) generated and stored for the user 140 during an enrollment process. In some implementations, the biometric authentication system may use a machine-learning process (e.g., a deep learning process implemented using a deep neural network architecture) to match the user 140 to his or her stored template. In some implementations, the machine-learning process may be implemented, at least in part, using one or more processing devices deployed on the kiosk 100. In some implementations, the kiosk 100 may communicate with one or more remote processing devices (e.g., one or more remote servers) that implement the machine learning process (see FIG. 2).

Figure 2:
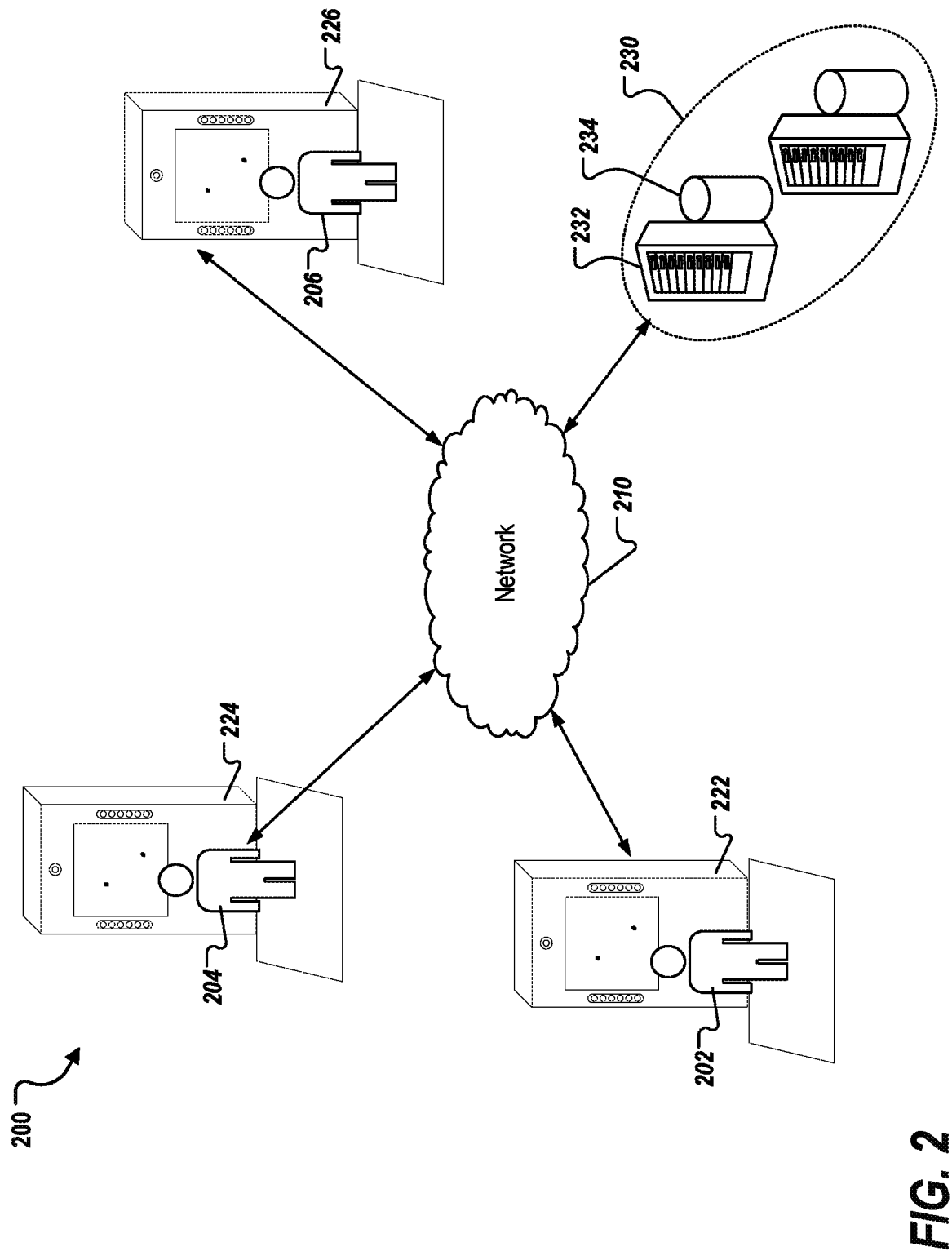
FIG. 2 depicts an example environment that can be employed to multi instances of a biometric authentication system.

FIG. 2 depicts an example environment 200 that can be employed to execute and/or coordinate multi instances of the described biometric authentication system. The example environment 200 includes network 210, a back-end system 230, and kiosk devices 222-226. The kiosk devices 222-226 are substantially similar to the kiosk device 100 of FIG. 1.

In some implementations, the network 210 includes a local area network (LAN), wide area network (WAN), the Internet, or a combination thereof, and connects computing devices (e.g., the kiosk devices 222-226) and back-end systems (e.g., the back-end system 230). In some implementations, the network 210 can be accessed over a wired and/or a wireless communications link.

In the depicted example, the back-end system 230 includes at least one server system 232 and a data store 234. In some implementations, the back-end system 230 provides access to one or more computer-implemented services with which the kiosks 222-226 may interact. The computer-implemented services may be hosted on, for example, the at least one server system 232 and the data store 234. The computer-implemented services may include, for example, an authentication service that may be used by the kiosks 222-226 to authenticate a user based on collected pressure signatures and/or image data.

In some implementations, the back-end system 230 includes computer systems employing clustered computers and components to act as a single pool of seamless resources when accessed through the network 210. For example, such implementations may be used in data center, cloud computing, storage area network (SAN), and network attached storage (NAS) applications. In some implementations, the back-end system 230 is deployed and provides computer-implemented services through a virtual machine(s).

Figure 3:
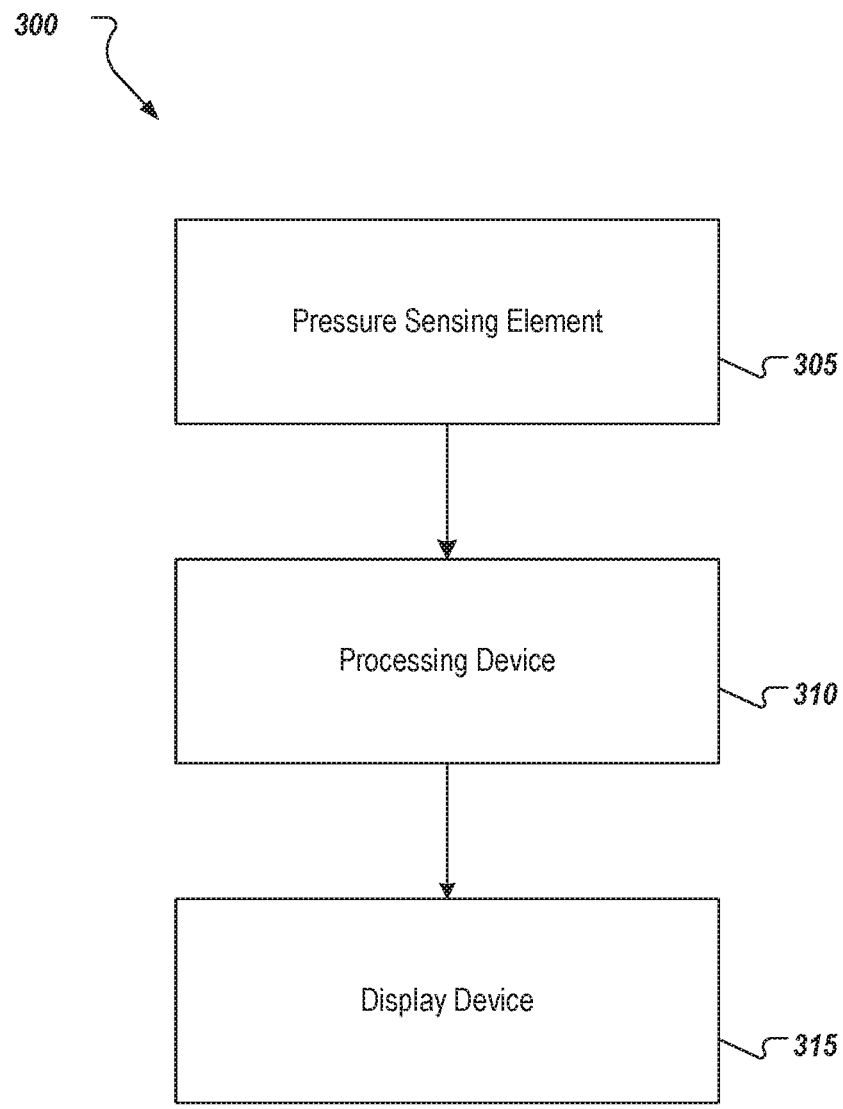
FIG. 3 depicts a system that can be used to implement the technology described herein.

FIG. 3 depicts a system 300 that can be used to implement the technology described herein. The system 300 includes sensing element 305, a processing device 310, and a display device 315. In come implementations, the system 300 may be included within a kiosk, such as described with reference to FIG. 1. For example, the display device 315 can be the display device 110 and the pressure sensing element 305 can be a component of the pressure sensor 130. In some implementations, the display device 315 can be disposed on a mobile device, such as a smartphone, tablet computer, or an e-reader. The pressure sensing element 305 detects pressure as it is applied (e.g., by a user walking or standing on the pressure sensing element 305). Example types of pressure sensing element 305 include electromechanical pressure sensors and analog pressure sensors though other types of pressure sensing element may be used. The pressure sensing element 305 may include FSRs to detect, for example, physical pressure, squeezing, and weight.

Outputs from the pressure sensing element 305 can be processed using one or more processing devices 310. In some implementations, the output of the one or more processing devices 310 may be used to drive a display device 315. The one or more processing devices 310 can be configured to process the outputs from the pressure sensing element 305 in various ways. In some implementations, the one or more processors 310 are configured to generate a static and/or a dynamic pressure signature for a user. A dynamic pressure signature may include the approximate size and shape of a user's foot, partial attributes, in case of specialty footwear, such as the width of the sole and an overall approximate length of the shoe/foot (e.g., if the user is wearing high heels), the user's weight, and how the user walks or moves, such as the area of the foot the predominantly touches the ground, the first point of impact on the foot, how pressure points progress, gait patterns, and so forth.

Figure 4:
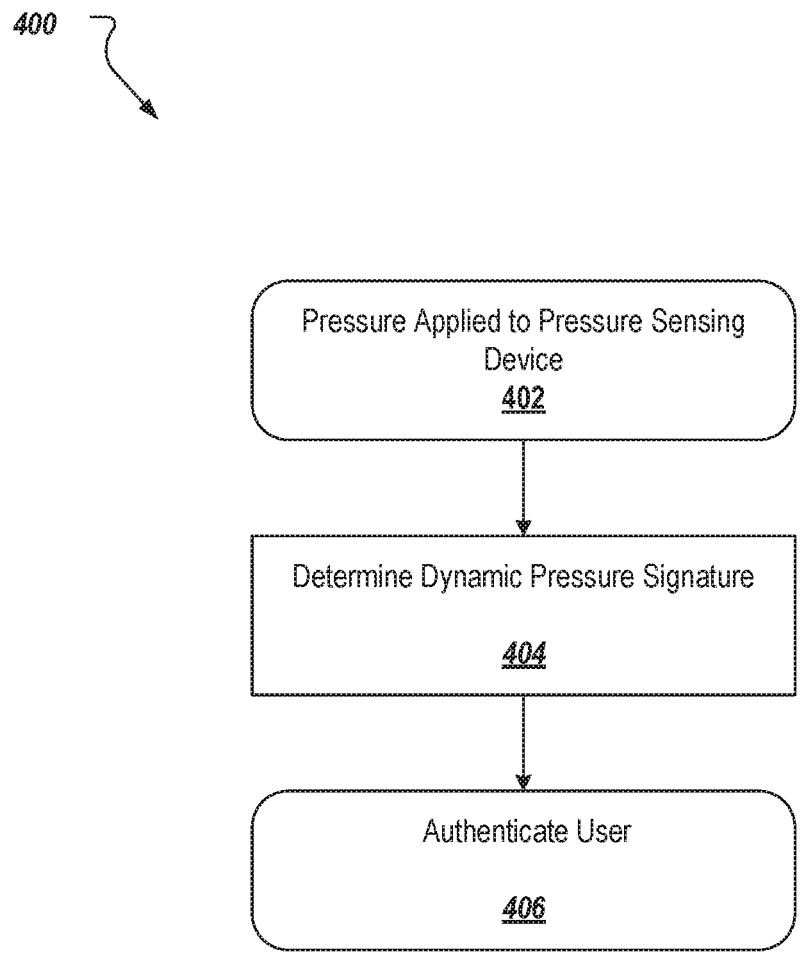
FIG. 4 is a flowchart of an example process employed within a biometric authentication system.

FIG. 4 depicts a flow diagram of an example process 400 employed within a biometric authentication system deployed on, for example, a kiosk device, such as kiosk 100 of FIG. 1. At 402, as a user applies pressure to a pressure sensing device, pressure measurement data is captured. In some implementations, the user applies pressure to the pressure sensing device by standing on the pressure sensing device. In some implementations, the user applies pressure to the pressure sensing device by walking across the pressure sensing device. In some implementations, the pressure sensing device includes a communication interface and the pressure measurement data is received through the communication interface. In some implementations, the pressure sensing device is embedded in flooring. In some implementations, the pressure sensing device includes an array of pressure sensing elements. In some implementations, each of the pressure sensing elements comprises at least one FSR. From 402, the process 400 moves to 404.

At 404, a dynamic pressure signature for the user is determined based on the pressure measurement data. The dynamic pressure signature including a temporal sequence of the pressure maps. In some implementations, the dynamic pressure signature includes at least one of which of the user's feet predominantly touches the ground as the user walks, a first point of impact on each of the users feet as the user walks, the progression of pressure points as the user walks, and gait patterns for the user. In some implementations, the pressure maps includes a collection of time signals derived from each pressure pixel observed by the pressure sensitive device as the user applies pressure. In some implementations, the captured pressure measurement data includes the user's foot/show contour, an angle between the user's feet, curvature of the feet, gait, balance, sway, posture, weight distribution, the user's dominant foot, or ballistocardiograms. From 404, the process 400 moved to 406.

At 406, the user is authenticated based on a comparison of the dynamic pressure signature to an initial dynamic pressure signature. In some implementations, a similarity score is generated based on the comparison of the dynamic pressure signature to the initial dynamic pressure signature (e.g., an enrollment template) and the user is authenticated based on the similarity score. In some implementations, the similarity score in included in multimodal-biometric score and the user is authenticated based on the multimodal-biometric score. In some implementations, the similarity score is based on Euclidean distance of the dynamic pressure signature and the initial dynamic pressure signature. In some implementations, the initial dynamic pressure signature was captured as the user entered into an area where the signature is employed for short-term verification within that area. In some implementations, the initial dynamic pressure signature was captured during an earlier enrollment process. In some implementations, an image of the user is captured with a camera and a distance of the user from the camera is determined based on a position of the pressure sensing device. In such implementations, the user is authenticated is further based on a comparison of the image of the user to an initial image of the user captured during the enrollment process. In some implementations, a static pressure signature for the user is determined based on the pressure measurement data. In such implementations, the user is further authenticated based on a comparison of the static pressure signature for the user to an initial static pressure signature captured during the enrollment process. In some implementations, the static pressure signature includes an approximate size and shape of the user's foot or shoes. In some implementations, information is displayed to the user on a display based on the authentication. From 406, the process 400 ends.

Figure 5:
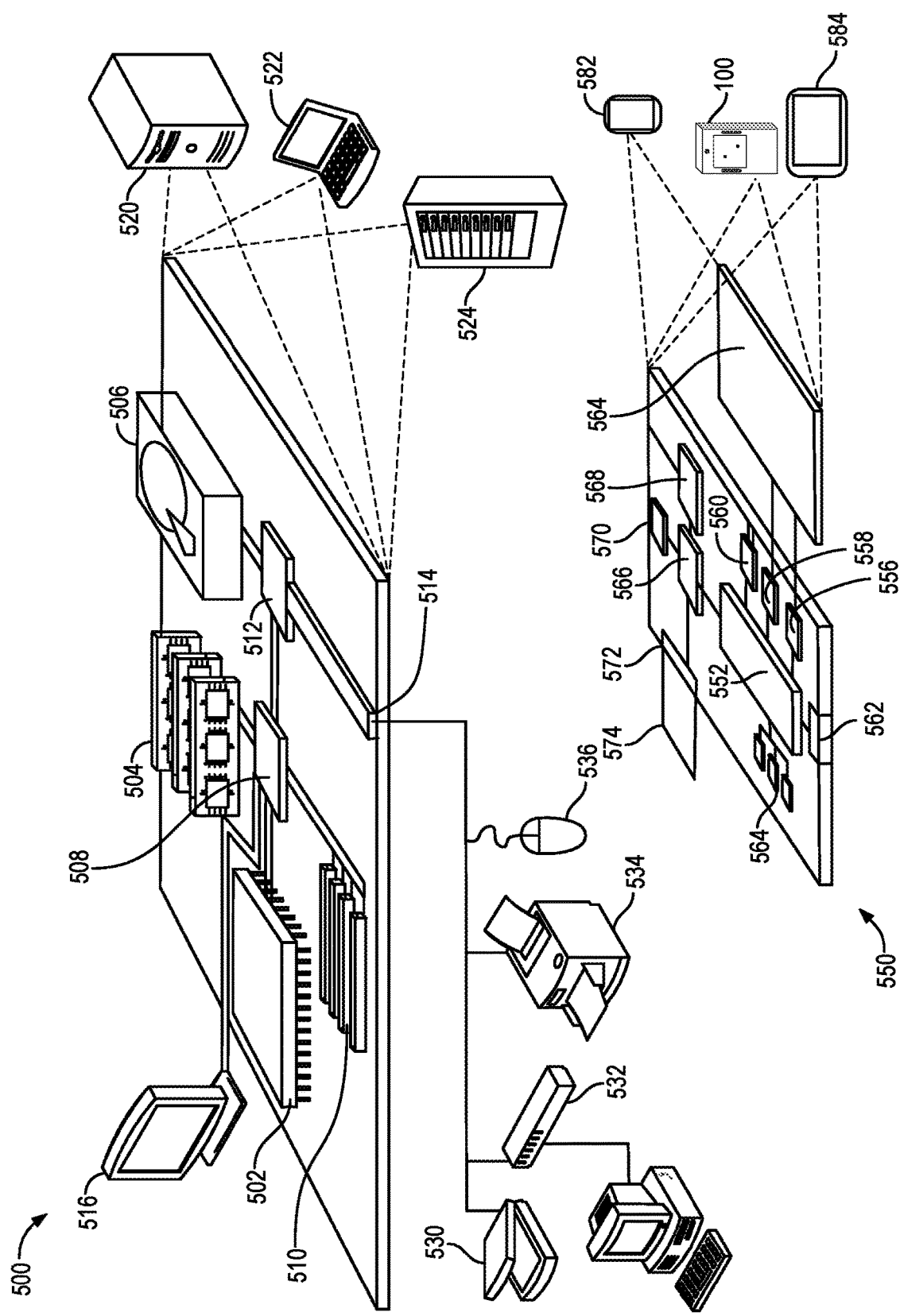
FIG. 5 is a block diagram representing examples of computing devices.

FIG. 5 shows an example of a computing device 500 and a mobile computing device 550 that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices. Such input/output devices may include a scanner 530, a printing device 534, or a keyboard or mouse 536. The input/output devices may also be coupled to the low-speed expansion port 514 through a network adapter. Such network input/output devices may include, for example, a switch or router 532.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, it may be implemented the kiosk 100 described in FIG. 1. Other implementations may include a mobile device 582 and a tablet device 584. The mobile computing device 550 may also be implemented as a component of a smartphone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 110 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for authenticating a user based on pressure measurement data, the method being executed by one or more processors and comprising:
    capturing pressure measurement data as a sequence of pressure maps as the user applies pressure to a pressure sensing device;
    determining a dynamic pressure signature for the user based on the pressure measurement data, the dynamic pressure signature including a temporal sequence of the pressure maps; and
    authenticating the user based on a comparison of the dynamic pressure signature to an initial dynamic pressure signature.

2. The computer-implemented method of claim 1, comprising:
    generating a similarity score based on the comparison of the dynamic pressure signature to the initial dynamic pressure signature; and
    authenticating the user based on the similarity score.

3. The computer-implemented method of claim 2, wherein the similarity score is based on Euclidean distance of the dynamic pressure signature and the initial dynamic pressure signature.

4. The computer-implemented method of claim 2, wherein the similarity score in included in multimodal-biometric score; and wherein the user is authenticated based on the multimodal-biometric score.

5. The computer-implemented method of claim 1, wherein the pressure maps includes a collection of time signals derived from each pressure pixel observed by the pressure sensing device as the user applies pressure.

6. The computer-implemented method of claim 5, wherein the dynamic pressure signature includes at least one of which of the user's feet predominantly touches the ground as the user walks, a first point of impact on each of the users feet as the user walks, a progression of pressure points as the user walks, and gait patterns for the user.

7. The computer-implemented method of claim 1, wherein the captured pressure measurement data includes the user's foot/show contour, an angle between the user's feet, curvature of the user's feet, gait, balance, sway, posture, weight distribution, the user's dominant foot, or ballistocardiograms.

8. The computer-implemented method of claim 1, wherein the initial dynamic pressure signature was captured as the user entered into an area.

9. The computer-implemented method of claim 1, wherein the initial dynamic pressure signature was captured during an enrollment process.

10. The computer-implemented method of claim 9, comprising:
    capturing, with a camera, an image of the user, wherein a distance of the user from the camera is determined based on a position of the pressure sensing device, wherein authenticating the user is further based on a comparison of the image of the user to an initial image of the user captured during the enrollment process.

11. The computer-implemented method of claim 9, comprising:
determining a static pressure signature for the user based on the pressure measurement data; wherein authenticating the user is further based on a comparison of the static pressure signature for the user to an initial static pressure signature captured during the enrollment process.

12. The computer-implemented method of claim 11, wherein the static pressure signature includes an approximate size and shape of the user's foot or shoes.

13. The computer-implemented method of claim 1, wherein the user applies pressure to the pressure sensing device by standing on the pressure sensing device or by walking across the pressure sensing device.

14. The computer-implemented method of claim 1, wherein the pressure sensing device is embedded in flooring.

15. A system, comprising:
a pressure sensor device;
a one or more processors; and
a computer-readable storage device coupled to the one or more processors and having instructions stored thereon which, when executed by the one or more processors, cause the one or more processors to perform operations comprising:
capturing pressure measurement data as a sequence of pressure maps as a user applies pressure to the pressure sensing device;
determining a dynamic pressure signature for the user based on the pressure measurement data, the dynamic pressure signature including a temporal sequence of the pressure maps; and
authenticating the user based on a comparison of the dynamic pressure signature to an initial dynamic pressure signature.

16. The system of claim 15, comprising:
a display,
wherein the operations comprise:
displaying, on the display, information to the user based on authenticating the user.

17. The system of claim 15, wherein the pressure sensing device comprises a communication interface; and wherein the pressure measurement data is received through the communication interface.

18. The system of claim 15, wherein the pressure sensing device comprises an array of pressure sensing elements.

19. The system of claim 18, wherein each of the pressure sensing elements comprises at least one force sensitive resistor (FSR).

20. One or more non-transitory computer-readable storage media coupled to one or more processors and having instructions stored thereon which, when executed by the one or more processors, cause the one or more processors to perform operations comprising:
capturing pressure measurement data as a sequence of pressure maps as a user applies pressure to the pressure sensing device;
determining a dynamic pressure signature for the user based on the pressure measurement data, the dynamic pressure signature including a temporal sequence of the pressure maps; and
authenticating the user based on a comparison of the dynamic pressure signature to an initial dynamic pressure signature.

* * * * *